Sept. 6, 1966         J. L. BEZEMEK         3,271,737
           WEAR INDICATING ARRANGEMENT FOR VEHICLE
                  POWER TRANSFER DEVICES
                   Filed March 25, 1964
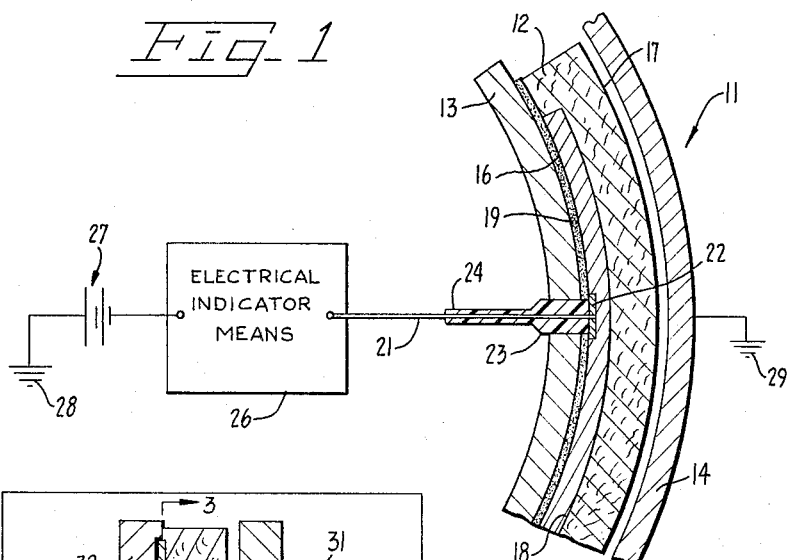
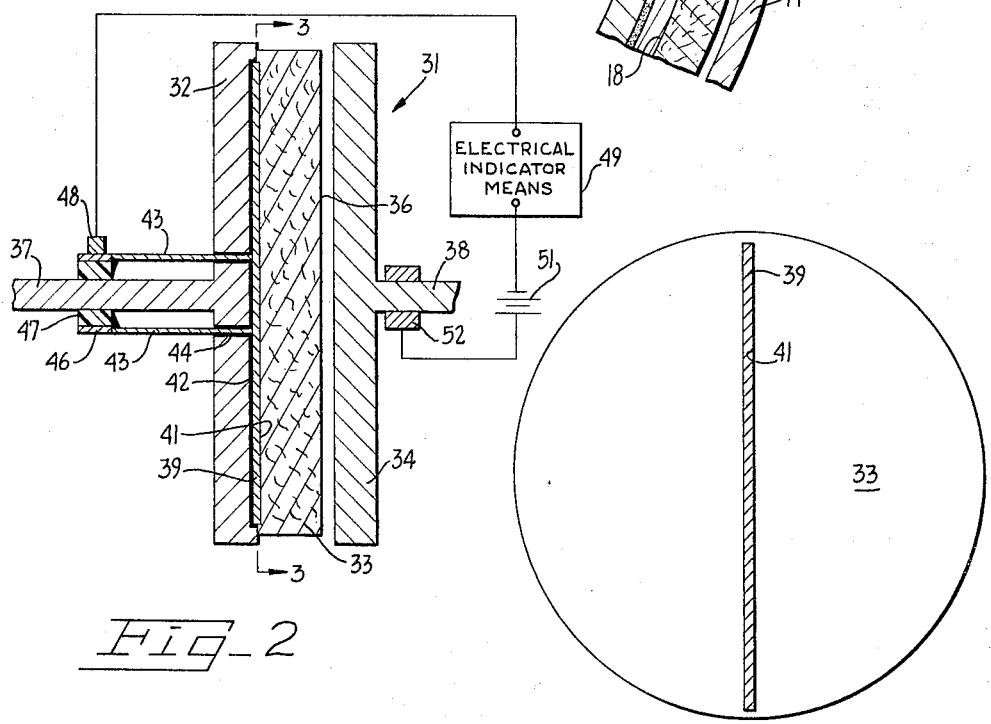
INVENTOR.
JAMES L. BEZEMEK
BY
ATTORNEYS United States Patent Office 3,271,737
Patented Sept. 6, 1966

3,271,737
WEAR INDICATING ARRANGEMENT FOR
VEHICLE POWER TRANSFER DEVICES
James L. Bezemek, 1454 Dayton Ave.,
San Leandro, Calif.
Filed Mar. 25, 1964, Ser. No. 354,650
11 Claims. (Cl. 340—52)

The present invention relates to devices for indicating excessive wear of normally unobservable wearing surfaces of power transfer devices such as brake shoes, clutch assemblies, and the like, and is particularly directed to an indicating device of this type which is capable of indicating wear in substantially any area of an entire wearing friction surface with negligible false indicating signals.

Various wear indicating devices have been advanced heretofore to provide an indication of wear of the wearing friction surface of a brake shoe or the like to a predetermined replacement point. However, these conventional devices have suffered from various limitations and disadvantages which have apparently precluded their widespread acceptance in practical use. Typically, previous wear indicating devices have included an electrically conductive point contact imbedded in a break lining at a predetermined depth beneath the wearing friction surface thereof and in some manner electrically insulated from the lining. The point contact is connected in a ground return series circuit including for example a battery and light or equivalent indicator, while the brake drum is connected to ground. The contact and drum thus function as the terminals of a switch which is closed when the brake lining wears down sufficiently to expose the point contact and thereby establish electrical conduction between the contact and drum upon application of the brakes. The light is hence lit as an indication of excessive wear of the lining requiring replacement. One shortcoming of this type of indicating device is readily apparent in that it is difficult if not impossible to determine the area of greatest or fastest wear of the brake lining. Thus, in many instances the lining wears down excessively in some areas while the point contact is still not exposed. Consequently, the light is not lit even though the lining has worn to the replacement point. In addition, the design of various previous wear indicating devices has been such that the point contact is quite susceptible to being shorted by dirt, metallic dust from the brake drum, moisture, etc., thus resulting in the generation of a false wear indicating signal.

It is therefore an object of the present invention to provide a wear indicating device of improved design which is capable of indicating a predetermined extent of wear in substantially any area of the wearing surface of a friction member.

Another object of the invention is the provision of a wear indicating device which may be employed with a variety of frictional power transfer devices such as brakes, clutch assemblies, grinders, etc., to indicate when a wearing friction surface thereof has worn down to such an extent that replacement of the friction member is required to insure further safe, non-detrimental operation of the transfer device.

Still another object of the invention is to provide a wear indicating switch wherein one contact is defined by a region of metallic, partially metallic, or other electrically conductive material imbedded or partially imbedded in a wearing friction member in insulated relation thereto beneath the wearing surface in such a pattern as to be exposed upon excessive wear in substantially any area of the wearing surface.

It is yet another object of the invention to provide a device of the class described wherein the conductive region of the wearing friction member is physically sealed to provide protection against accidental contact being made by the entry of dirt, moisture, metallic dust resulting from operation of the associated transfer equipment, or the like.

It is a further object of the invention to provide a device of the class described wherein the conductive region of the wearing friction member is formed of non-metallic material having a composition to provide similar abrasive qualities as those of the friction member material whereby the frictional function of the wearing surface is not in the least impaired when the conductive region makes excessive wear indicating contact with a brake drum or equivalent relatively non-wearing metallic surface.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a fragmentary sectional view of a brake assembly embodying the wear indicating device of the present invention, electrical components being illustrated in schematic.

FIGURE 2 is a longitudnal sectional view of a clutch assembly embodying the wear indicating device of the present invention, electrical components being illustrated in schematic.

FIGURE 3 is a plan view taken at line 3—3 of FIGURE 2.

Considering now the invention in some detail and referring to the illustrated forms thereof in the drawing, there will be seen to be provided a wear indicating device for providing an indication of a predetermined extent of wear of the wearing surface of a friction member of a power transfer device such as a brake assembly, clutch assembly, or the like. The indicating device in its basic aspects includes a conductive region which is imbedded or partially imbedded in the friction member at a predetermined depth beneath the wearing surface thereof. The conductive region is insulated from the wearing material of the friction member and from any adjacent conducting elements of the power transfer device. If the friction member is of electrically insulating material and the conductive region is fully imbedded therein, no additional insulation is required. However, if the friction member is of conductive material or the conducting region is only partially imbedded in the friction member, whether same is of conducting or insulating material, the conductive region is at least in part covered by a layer of insulating material. Of particular importance in the accomplishment of the objects of the invention, the conductive region underlies the wearing surface of the friction member in a pattern extending under substantially all areas of the surface. The conductive region may be defined by a strip, mesh, etc. of metallic material such as copper, brass, or the like. Alternatively, the conductive region may be of an impregnated metallic powder composition incorporated in the abrasive composition of the friction member during the manufacture thereof. As a further alternative, the conductive region may be of a conducting non-metallic material such as carbon, graphite, etc., and preferably of a composition of non-metallic materials having abrasive qualities similar to those of the friction member. In this latter regard, it will be appreciated that when an area of the wearing surface of the friction member wears down to the conductive region there is no loss in the abrasive qualities of the wearing surface. The wear indicating device is completed by an insulated lead-in conductor in conducting relation to the conductive region of the friction member. The lead-in conductor is in series connection with an electrical indicator means, such as a light, buzzer, meter, etc., and a battery in turn conductively coupled to a relatively non-wearing metallic member of the power transfer device contacted by the friction member. Thus, the indicator means is normally de-energized by virtue of the friction member material or other insulation covering the conductive region preventing electrical contact between the conductive region and non-wearing member of the power transfer device. However, when an area of the wearing friction surface of the friction member in contacting the non-wearing member wears down sufficiently to expose the conductive region, contact is established between the conductive region and non-wearing member. Current thus flows through the series circuit including the indicator means to thereby energize the latter and provide an indication that the wearing surface of the friction member has worn down to the point that replacement is required.

It will be appreciated that the wear indicating device outlined hereinbefore may be employed in numerous power transfer devices. Accordingly although the indicating device is described in detail hereinafter and illustrated in the drawing with respect to but several possible power transfer devices with which it may be employed, namely a brake assembly and a clutch assembly, no limitations are intended nor to be inferred from these specific showings of the wear indicating device.

Considering now the wear indicating device in detail as to preferred structure in its incorporation in a brake assembly, and referring to FIGURE 1, the brake assembly is indicated at 11. The assembly includes a friction member in the form of a brake lining 12 mounted upon a metallic brake shoe 13 provided in a conventional manner in operative relationship with a metallic brake drum 14 for contacting brake lining 12 upon the application of the brakes as is understood in the art. For the purposes of the present invention, the lining is provided with a conductive region 16 at a predetermined depth beneath the wearing surface 17 of the lining. The region 16 underlies substantially the entire circumferential extent of the wearing surface 17, and in the illustrated case is in the form of a partially imbedded metallic strip disposed in a groove 18 in the lining surface secured to the shoe 13. The strip and groove may be centrally disposed with respect to the lining surface, have a zig-zag pattern, or be otherwise arranged in a pattern underlying areas of substantially the entire wearing surface 17. The conductive region 16 may of course be provided in any of the alternative manners discussed hereinbefore.

The lining 12 is of electrically insulating material in the present case and consequently normally insulates the conductive region 16 from the drum 14. Inasmuch as the region 16 is only partially imbedded in the lining in the present case, i.e., the exterior side of the strip disposed in the groove is exposed, provision is made to insulate the conductive region from the shoe. In this regard an electrically insulating bonding 19 is preferably employed to secure the lining 12 to the shoe 13 at the lining surface containing the groove 18. Such bonding of course also serves to insulate the conductive region 16 from the metallic shoe.

To facilitate connection of the conductive region 16 in an electrical indicator circuit, a lead-in conductor 21 is preferably terminated in a contact pin 22, or the like which is imbedded or otherwise conductively secured to the conductive region 16. The conductor 21 extends through an insulating feed through bushing 23, or equivalent means provided in an aperture through the shoe. The bushing insulates the conductor from the shoe and an electrically insulating sheath 24 may be provided to extend from the bushing and encompass the conductor to insulate same from other conducting components of the brake assembly.

The conductor 21 is connected to electrical indicator means 26, such as a light, buzzer, etc., which is connected to one terminal of a battery 27 or equivalent source of electrical current. The other terminal of the battery is connected to ground, as indicated at 28, while the brake drum 14 is connected to ground, as indicated at 29. There is thus provided a ground return circuit which includes a switch defined by the drum, conductive region 16, and interposed lining 12, and the indicator means 26 and battery 27 in series. The switch is normally open by virtue of the lining insulating the two switch contacts defined by the drum and conductive region, and as a result no current flows through the circuit and the indicator means is not energized. When an area of the wearing surface of the lining wears down excessively, however, a portion of the conductive region 16 is exposed and upon application of the brakes makes contact with the drum. The switch is thus closed to thereby establish current flow through the circuit and energize the indicator means. An indication is thus provided of the brake lining being worn to the extent that replacement is required.

Considering now the application of a wear indicating device in accordance with the invention to a friction clutch assembly, reference is now made to FIGURES 2 and 3. The clutch assembly is indicated at 31 and will be seen to include a clutch plate 32 having a friction member 33 mounted upon a face thereof, and a clutch pressure plate 34 adapted to engage the wearing surface 36 of the member 33 upon engagement of the clutch in a well known manner. Upon engagement of the clutch, input and output shafts 37, 38, extending from the plates 32, 34 are coupled through the frictional engagement of the member 33 with the plate 34. The friction member of course wears after extended use and requires replacement.

In order to provide an indication of wear of the friction member to a predetermined replacement point, a conductive region 39 is imbedded or otherwise contained in the member at a predetermined depth beneath the wearing surface 36. In the illustrated case, the region 39 is provided as a strip of conductive material which extends diametrically across the friction member in a groove 41 in the face of the member secured to the plate 32. Such a diametric strip serves to provide an indication of excessive wear in substantially any annular region of the wearing surface, diametrically of the member. It will be appreciated that the conductive region may be alternatively provided in any of the ways noted previously, and that the region may be in a variety of diverse patterns depending upon the precision with which wear is to be indicated. The member 33 is of electrically insulating material in the instant case and insulating bonding 42 is employed to secure the friction member to the plate 32 and thereby insulate the conductive region 39 from the plate.

Lead-in conductors 43 are terminated in electrical contact with the conductive region 39 and extend through the bonding 42 and insulating bushings 44 mounted in the plate 32. The conductors 43 are connected to a collector ring 46 which circumscribes an insulating collar 47 secured to the shaft 37. Consequently, the conductive region 39 is electrically connected to the collector ring 46 while being insulated from the plate 32 and shaft 37.

In order to facilitate connection of the conductive region in circuit with the plate 34, a brush 48 is mounted in bearing relation to the collector ring 46. The brush is connected in series with an electrical indicator means 49 and battery 51 in turn coupled to the plate 34 through, for example, a bearing 52 in electrical contact with the shaft 38. Thus, the insulating material of the friction member 33 prevents electrical contact from occurring between the conductive region 39 and plate 34 until a region of the friction member wears sufficiently to expose the conductive region. Accordingly, no current flows in the circuit until an area of the wearing surface of the friction member is excessively worn and contact is made between the conductive region 39 and plate 34. At this time current flows in the circuit and the indicator means 49 is energized.

What is claimed is:

1. A wear indicating device for a friction member having a wearing surface for engaging a relatively non-wearing electrically conductive member comprising a conductive region disposed in insulated relation within said friction member at a predetermined depth beneath said wearing surface in a pattern extending under substantially all areas of the surface, insulated lead-in conductor means in electrical connection with said conductive region, an indicator circuit including electrical indicator means and a current source in series, and means for connecting said circuit in conductive relation between said lead-in conductor means and said non-wearing member.

2. A wear indicating device according to claim 1, further defined by said conductive region being of non-metallic material having a composition with abrasive qualities comparable to those of the material of said friction member.

3. In a frictional power transfer device including a friction member of electrical insulating material having a wearing surface engageable with a relatively non-wearing metallic member, the combination comprising a region of conductive material imbedded within said friction member at a predetermined depth beneath said wearing surface, said region having a pattern extending under substantially all areas of said wearing surface, insulated lead-in conductor means in electrical connection with said conductive region, electrical indicator means, a current source, and means connecting said lead-in conductor means and said non-wearing member in series with said indicator means and current source.

4. The combination of claim 3, wherein said conductive region is of non-metallic material having a composition with abrasive qualities comparable to those of the material of said friction member.

5. A wear indicating device for use with the lining of a brake assembly including a shoe mounting the lining and a drum engageable with a wearing surface of the lining, comprising a region of electrically conductive material contained within said lining at a predetermined depth beneath the wearing surface thereof and insulated from the lining and shoe, said conductive region having a pattern extending under substantially all areas of said wearing surface, a lead-in conductor in electrical contact with said conductive region and extending through said shoe in insulated relation thereto, electrical indicator means and a current source connected in series between said lead-in conductor and ground, and means grounding said drum.

6. The combination of a brake drum, a brake lining of electrical insulating material, a shoe for mounting said lining and moving a wearing surface thereof into engagement with said drum, an electrically conductive region disposed within said lining at a predetermined depth beneath said wearing surface, said region having an exposed surface at the opposite surface of said lining from said wearing surface and extending substantially the entire circumferential extent thereof, a bonding of electrically insulating material covering said exposed surface of said conductive region and securing said opposite surface of said lining to said shoe, an insulating bushing extending through said shoe, a lead-in conductor in electrical contact with said conductive region and extending through said bonding and bushing, electrical indicator means, a battery, and means connecting said lead-in conductor and said drum in series with said indicator means and battery.

7. The combination of claim 6, further defined by said conductive region being of non-metallic material having a composition with abrasive qualities comparable to those of the material of said lining.

8. A wear indicating device for use with the friction member of a clutch assembly which is for transferring rotary motion and which includes a rotary clutch plate mounting said friction member for rotation therewith and a pressure plate engageable with a wearing surface of said friction member to cause the rotary motion of said friction member to be imparted thereto, comprising an electrically conductive region contained within said friction member in insulated relation thereto at a predetermined depth beneath said wearing surface and extending generally diametrically of said friction member and of a length such that on rotation of said friction member relative to said pressure plate said conductive region will sweep over substantially the entire opposed surface of the pressure plate, insulated lead-in conductor means in electrical contact with said conductive region, electrical indicator means, a current source, and means connecting said lead-in conductor means and said pressure plate in series with said indicator means and current source.

9. A wear indicating device according to claim 8, further defined by said conductive region being of non-metallic material having a composition with abrasive qualities comparable to those of the material of said friction member.

10. The combination of a clutch plate, a friction member of electrically insulating material having a conductive strip disposed in a diametric groove formed in a first surface thereof, electrically insulating bonding securing said first surface of said friction member to said clutch plate, a pressure plate engageable with a second wearing surface of said friction member, first and second shafts extending from said clutch and pressure plates, an insulating collar secured to said first shaft, a collector ring circumscribing said collar, lead-in conductors in electrical contact with said strip and extending through said clutch plate in insulated relation thereto, said conductors connected to said collector ring, a brush bearing upon said ring, electrical indicator means, a current source, and means connecting said brush and said second shaft in series with said indicator means and current source.

11. A wear indicating device for a friction member having a rotatable wearing surface for engaging a relatively non-wearing surface of an electrically conductive member and imparting rotary motion to said conductive member, said device comprising a conductive region disposed in insulated relation within said friction member at a predetermined depth beneath said wearing surface in a pattern extending generally diametrically of said friction member and of a length such that on rotation of said friction member relative to said conductive member said conductive region will sweep across substantially the entire non-wearing surface of the conductive member, insulated lead-in conductor means in electrical connection with said conductive region, an indicator circuit including electrical indicator means and a current source in series, and means for connecting said circuit in conductive relation between said lead-in conductor means and said non-wearing member.

References Cited by the Examiner

UNITED STATES PATENTS 1,902,759  3/1933  Cataudella _____ 200—61.4 X
2,217,176  10/1940  Madison _____ 340—52

NEIL C. READ, *Primary Examiner.*

A. H. WARING, *Assistant Examiner.*